United States Patent
Li et al.

(10) Patent No.: US 12,539,777 B2
(45) Date of Patent: Feb. 3, 2026

(54) ELECTRIC DRIVE SYSTEM, POWERTRAIN, HEATING METHOD, AND ELECTRIC VEHICLE

(71) Applicant: Huawei Digital Power Technologies Co., Ltd., Shenzhen (CN)

(72) Inventors: Haojie Li, Xi'an (CN); Chaoqiang Wu, Shenzhen (CN); Mengxuan Lin, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 334 days.

(21) Appl. No.: 18/467,023

(22) Filed: Sep. 14, 2023

(65) Prior Publication Data

US 2024/0001777 A1   Jan. 4, 2024

Related U.S. Application Data

(63) Continuation of application No. PCT/CN2021/083976, filed on Mar. 30, 2021.

(51) Int. Cl.
*B60L 50/60* (2019.01)
*B60L 3/00* (2019.01)
(Continued)

(52) U.S. Cl.
CPC .......... *B60L 50/60* (2019.02); *B60L 3/0046* (2013.01); *B60L 3/0061* (2013.01); *B60L 50/51* (2019.02); *B60L 58/25* (2019.02); *B60L 58/27* (2019.02)

(58) Field of Classification Search
CPC ........ B60L 50/51; B60L 58/27; B60L 15/025; B60L 2210/40; B60L 3/0061; B60L 50/60; B60L 2240/545; B60L 3/0046; B60L 15/20; B60L 2220/14; B60L 2210/10; B60L 2240/425; B60L 2210/42; B60L 58/26; B60L 2220/56; B60L 2240/429; B60L 2240/662; B60L 1/003; B60L 2210/30; B60L 2240/547; B60L 7/14; B60L 3/003; B60L 50/66; B60L 58/18; B60L 58/25; H02P 27/06; H02P 29/62; H02P 21/22; H02P 23/00; H02P 25/022; H02P 25/22;
(Continued)

(56) References Cited

U.S. PATENT DOCUMENTS

2021/0351732 A1* 11/2021 Shen ................... H01M 10/637

FOREIGN PATENT DOCUMENTS

CN    107707171 B    9/2019
CN    111347925 A    6/2020

* cited by examiner

*Primary Examiner* — Antony M Paul
(74) *Attorney, Agent, or Firm* — Maier & Maier, PLLC

(57) ABSTRACT

An electric drive system and a heating method. The electric drive system includes an inverter circuit, a direct current-direct current conversion circuit, and a controller. An input end of the inverter circuit is connected to an input end of the electric drive system, and an output end of the inverter circuit is connected to three-phase motor windings of an electric excitation synchronous motor. An input end of the direct current-direct current conversion circuit is connected to the input end of the electric drive system, and an output end of the direct current-direct current conversion circuit is connected to an excitation winding of the electric excitation synchronous motor. In this solution, a heating apparatus does not need to be disposed when the power battery pack is heated, thereby reducing costs and saving space.

20 Claims, 10 Drawing Sheets

(51) Int. Cl.
 *B60L 50/51* (2019.01)
 *B60L 58/25* (2019.01)
 *B60L 58/27* (2019.01)

(58) Field of Classification Search
 CPC .. H02P 2101/45; H02P 27/08; H02P 2201/07; H02P 2201/09; H02P 2201/11; H02P 2207/05; H02P 29/68; H02P 29/60; H02P 23/07; H02P 6/08; B60H 1/143; H02K 11/30; H02K 3/28
 See application file for complete search history.

ELECTRIC DRIVE SYSTEM, POWERTRAIN, HEATING METHOD, AND ELECTRIC VEHICLE

CROSS-REFERENCE TO RELATED APPLICATIONS

This application is a continuation of International Application No. PCT/CN2021/083976, filed on Mar. 30, 2021, the disclosure of which is hereby incorporated by reference in its entirety.

TECHNICAL FIELD

The embodiments relate to the field of electric vehicle technologies, an electric drive system, a powertrain, a heating method, and an electric vehicle.

BACKGROUND

As problems of energy shortage and environmental pollution become increasingly serious in modern society, electric vehicles, as new energy vehicles, have received widespread attention from all walks of life. The electric vehicle is provided with electric energy by a power battery pack, and the electric energy is converted into mechanical energy by a motor to drive the electric vehicle. As the electric vehicles are deployed on a large scale, many electric vehicles are used in areas cold in winter or cold all year round. In a low-temperature environment, viscosity of electrolyte in the power battery pack increases, which causes discharge performance of the power battery pack to decline. Therefore, the power battery pack needs an efficient low-temperature heating measure to ensure that the power battery pack can work in a safe temperature range. In the conventional technology, the power battery pack is heated by adding a heating apparatus.

FIG. 1 is a schematic diagram of a heating apparatus of a power battery pack according to the conventional technology.

The heating apparatus includes a positive temperature coefficient (PTC) resistor Rp and a controllable switching transistor S. Rp and S are connected in series, and Rp and S are connected in parallel to a bus capacitor Co of an electric vehicle. When a battery management system (BMS) of the electric vehicle determines that a temperature of the battery is low, S is controlled to be switched off, and Rp releases heat after being connected to a circuit, to heat a power battery pack 10. However, the additional heating apparatus needs to be added in this heating manner, which occupies space and increases costs.

SUMMARY

The embodiments provide an electric drive system, a powertrain, a heating method, and an electric vehicle. When a power battery pack is heated, no additional heating apparatus needs to be added, thereby reducing costs and saving space.

According to a first aspect, the embodiments provide an electric drive system. An input end of the electric drive system is connected to a power battery pack, and an output end of the electric drive system is connected to an electric excitation synchronous motor. The electric drive system includes an inverter circuit, a direct current (DC)-direct current conversion circuit, and a controller. An input end of the inverter circuit is connected to the input end of the electric drive system, and an output end of the inverter circuit is connected to three-phase windings of the electric excitation synchronous motor. The inverter circuit converts a direct current provided by the power battery back into an alternating current and provides the alternating current for the three-phase windings, that is, the inverter circuit is configured to output three-phase currents to the motor. An input end of the direct current-direct current conversion circuit is connected to the input end of the electric drive system, and an output end of the direct current-direct current conversion circuit is connected to an excitation winding of the electric excitation synchronous motor. The direct current-direct current conversion circuit performs direct current conversion on the direct current provided by the power battery pack and provides the direct current for the excitation winding, that is, the direct current-direct current conversion circuit is configured to output an excitation current. The controller is configured to control the inverter circuit and the direct current-direct current conversion circuit, to adjust the three-phase currents output by the inverter circuit and adjust the excitation current output by the direct current-direct current conversion circuit, to enable a temperature of the power battery pack to be greater than or equal to a first temperature threshold.

The power battery pack is heated by using heat generated by the electric drive system and the electric excitation synchronous motor. Heating power of the three-phase windings can be adjusted by adjusting the three-phase currents output by the inverter circuit, heating power of the excitation winding can be adjusted by adjusting the excitation current output by the direct current-direct current conversion circuit, and the power battery pack is heated by using heat generated by the three-phase windings and the excitation winding and heat generated by a power switching component in the electric drive system without adding an additional heating apparatus. This reduces costs and saves space. Heating power consumption can further be adjusted by adjusting values of the three-phase currents and the excitation current, to make full use of a heating capability of the electric excitation synchronous motor. Therefore, heating efficiency of the power battery pack is further improved.

The controller may be an application-specific integrated circuit (ASIC), a programmable logic device (PLD), a digital signal processor (DSP), or a combination thereof. The PLD may be a complex programmable logic device (CPLD), a field programmable gate array (FPGA), generic array logic (GAL), or any combination thereof.

The inverter circuit and the direct current-direct current conversion circuit include a power switching component. The power switching component may be an insulated gate bipolar transistor (IGBT), a metal-oxide-semiconductor field-effect transistor (MOSFET), a silicon carbide field-effect transistor (SiC MOSFET), or the like. The controller controls a working state of the power switching component by sending a control signal to the power switching component. In a possible implementation, the control signal is a pulse width modulation (PWM) signal.

In a possible implementation, when determining that the temperature of the power battery pack is lower than the first temperature threshold, the controller controls the direct current-direct current conversion circuit to output an excitation current to the excitation winding and controls the inverter circuit to stop working. At this time, the excitation winding heats up to heat the power battery pack. The controller may determine the temperature of the power battery pack based on a temperature signal sent by a battery management system or a vehicle control unit. A relationship between the excitation current and the temperature can be pre-calibrated, stored in a form of a data table, and invoked when used.

In a possible implementation, when determining that the temperature of the power battery pack is lower than the first temperature threshold, the controller controls the inverter circuit to output the three-phase currents to the three-phase motor windings, so that a d-axis current of the electric excitation synchronous motor is a first preset d-axis current, and a q-axis current is zero, and controls the direct current-direct current conversion circuit to stop working. At this time, the electric excitation synchronous motor does not output torque, and the three-phase motor windings of the motor heats up to heat the power battery pack.

In a possible implementation, when determining that the temperature of the power battery pack is lower than the first temperature threshold, the controller controls the direct current-direct current conversion circuit to output an excitation current to the excitation winding, and controls the inverter circuit to output the three-phase currents to the three-phase motor windings, so that a d-axis current of the electric excitation synchronous motor is a first preset d-axis current, and a q-axis current is zero. At this time, the three-phase motor windings of the motor heat up and the excitation winding heats up, to heat the power battery pack.

In a possible implementation, the controller is further configured to determine the excitation current based on the temperature of the power battery pack, and a value of the excitation current is negatively correlated with the temperature of the power battery pack. A lower temperature of the power battery pack indicates higher heating power required for same heating time. Therefore, the excitation current needs to be increased to increase the heating power of the excitation winding.

In a possible implementation, the controller is further configured to determine the excitation current according to a heating instruction, and the heating instruction indicates a value of the excitation current. The heating instruction is generated in response to an operation of a user. For example, different heating levels correspond to heating instructions of different levels, and the heating instructions of different levels correspond to excitation currents of different values.

In a possible implementation, the controller is further configured to determine the first preset d-axis current based on the temperature of the power battery pack, and a value of the first preset d-axis current is negatively correlated with the temperature of the power battery pack.

In a possible implementation, the controller is further configured to determine the first preset d-axis current according to a heating instruction, and the first preset d-axis current indicates a value of the excitation current.

In a possible implementation, the controller may be configured to: determine an amplitude value and a phase of an input current of an each-phase motor winding based on the first preset d-axis current; determine an amplitude value and a phase of an input voltage of the each-phase motor winding based on the amplitude value and the phase of the input current of the each-phase motor winding and an impedance of the each-phase motor winding; and determine a duty cycle of a control signal of the inverter circuit based on the amplitude value of the input voltage, and determine sending time of the control signal of the inverter circuit based on the phase of the input voltage. The impedance of the motor winding is an inherent parameter of the motor winding, and may be pre-determined and stored, and invoked by the controller when used.

In a possible implementation, when determining that an electric vehicle is in motion and the temperature of the power battery pack is lower than the first temperature threshold, the controller controls the direct current-direct current conversion circuit to increase an excitation current output to the excitation winding, controls the inverter circuit to increase the three-phase currents output to the three-phase motor windings, and enables output torque of the electric excitation synchronous motor to be currently required torque. At this time, power of the electric excitation synchronous motor is increased, and excess power is used to generate heat to heat the power battery pack on condition that currently required torque is output.

In a possible implementation, the controller determines an amplitude value and a phase of an input current of an each-phase motor winding based on the currently required torque; determines an amplitude value and a phase of an input voltage of the each-phase motor winding based on the amplitude value and the phase of the input current of the each-phase motor winding and an impedance of the each-phase motor winding; and determines a duty cycle of a control signal of the inverter circuit based on the amplitude value of the input voltage, and determines sending time of the control signal of the inverter circuit based on the phase of the input voltage. The impedance of the motor winding is an inherent parameter of the motor winding, and may be pre-determined and stored, and may be invoked by the controller for use.

In a possible implementation, when determining that a rotor temperature of the electric excitation synchronous motor is greater than a second temperature threshold, the controller is further configured to control the direct current-direct current conversion circuit to reduce the excitation current, to avoid damage to the rotor of the motor due to overheating.

In a possible implementation, when determining that a stator temperature of the electric excitation synchronous motor is greater than a third temperature threshold, the controller is further configured to: control the inverter circuit to maintain the q-axis current at zero, and reduce the first preset d-axis current, to avoid damage to the stator of the motor due to overheating.

In a possible implementation, when determining that a rotor temperature of the electric excitation synchronous motor is greater than a second temperature threshold, the controller is further configured to: control the direct current-direct current conversion circuit to reduce the excitation current and control the inverter circuit to increase the three-phase currents, to maintain heating efficiency of the power battery pack while avoiding damage to the rotor of the motor due to overheating.

In a possible implementation, when determining that a stator temperature of the electric excitation synchronous motor is greater than a third temperature threshold, the controller is further configured to: control the inverter circuit to reduce the three-phase currents and control the direct current-direct current conversion circuit to increase the excitation current, to maintain heating efficiency of the power battery pack while avoiding damage to the stator of the motor due to overheating.

In a possible implementation, the inverter circuit is a three-phase two-level inverter circuit or a three-phase three-level inverter circuit.

In a possible implementation, the electric drive system further includes a cooling loop and a pump apparatus. The cooling loop is configured to perform heat exchange on the electric excitation synchronous motor and the power battery pack. The cooling loop includes a cooling working medium, and the cooling working medium is configured to: absorb heat when flowing through the electric excitation synchronous motor and release the heat when flowing through the power battery pack. The pump apparatus is configured to drive the cooling working medium to circulate in the cooling loop.

The pump apparatus may be controlled by a vehicle control unit or by the controller of the electric drive system.

In a possible implementation, the cooling loop is further configured to perform the heat exchange on the inverter circuit; and the cooling working medium is further configured to absorb heat when flowing through the inverter circuit. That is, heat generated by a motor control unit can further be used to heat the power battery pack.

According to a second aspect, the embodiments may further provide a powertrain of an electric vehicle. The powertrain includes the electric drive system provided in the foregoing embodiments, and further includes an electric excitation synchronous motor. An input end of the electric excitation synchronous motor is connected to an output end of the electric drive system. The electric excitation synchronous motor is configured to convert electric energy into mechanical energy to drive the electric vehicle.

According to the powertrain, heating power of windings of three phases can be adjusted by adjusting three-phase currents output by an inverter circuit, heating power of an excitation winding can be adjusted by adjusting an excitation current output by a direct current-direct current conversion circuit, and a power battery pack is heated by using heat generated by the three-phase windings and the excitation winding and heat generated by a power switching component in the electric drive system without adding an additional heating apparatus. This reduces costs of the powertrain and saves space and facilitates development of the powertrain in directions of miniaturization and high integration. Heating power consumption can further be adjusted by adjusting values of the three-phase currents and the excitation current, to make full use of a heating capability of the electric excitation synchronous motor. Therefore, heating efficiency of the power battery pack is further improved.

According to a third aspect, the embodiments may further provide a method for heating a power battery pack, applied to an electric drive system, where an output end of the electric drive system is configured to connect to an electric excitation synchronous motor, and the method for heating a power battery pack includes the following operations:
controlling an inverter circuit of the electric drive system and controlling a direct current-direct current conversion circuit of the electric drive system, so that a temperature of the power battery pack is greater than or equal to a first temperature threshold. The inverter circuit is configured to: convert a direct current into three-phase currents and provide the three-phase currents for three-phase motor windings of the electric excitation synchronous motor; and the direct current-direct current conversion circuit is configured to: perform direct current conversion on the direct current and provide the direct current for an excitation winding of the electric excitation synchronous motor.

According to the heating method, heating power of the three-phase windings is adjusted by adjusting the three-phase currents output by the inverter circuit, heating power of the excitation winding is adjusted by adjusting an excitation current output by the direct current-direct current conversion circuit, and the power battery pack is heated by using heat generated by the three-phase windings and the excitation winding and heat generated by a power switching component in the electric drive system without adding an additional heating apparatus. This reduces costs and saves space. Heating power consumption can further be adjusted by adjusting values of the three-phase currents and the excitation current, to make full use of a heating capability of the electric excitation synchronous motor. Therefore, heating efficiency of the power battery pack is further improved.

In a possible implementation, the controlling an inverter circuit of the electric drive system, and controlling a direct current-direct current conversion circuit of the electric drive system may include the following operation:
when it is determined that the temperature of the power battery pack is lower than the first temperature threshold, controlling the direct current-direct current conversion circuit to output an excitation current to the excitation winding, and controlling the inverter circuit to stop working.

In a possible implementation, the controlling an inverter circuit of the electric drive system, and controlling a direct current-direct current conversion circuit of the electric drive system may include the following operation:
when it is determined that the temperature of the power battery pack is lower than the first temperature threshold, controlling the inverter circuit to output the three-phase currents to the three-phase motor windings, so that a d-axis current of the electric excitation synchronous motor is a first preset d-axis current, and a q-axis current is zero, and controlling the direct current-direct current conversion circuit to stop working.

In a possible implementation, the controlling an inverter circuit of the electric drive system, and controlling a direct current-direct current conversion circuit of the electric drive system may include the following operation:
when it is determined that the temperature of the power battery pack is lower than the first temperature threshold, controlling the direct current-direct current conversion circuit to output an excitation current to the excitation winding, and controlling the inverter circuit to output the three-phase currents to the three-phase motor windings, so that a d-axis current of the electric excitation synchronous motor is a first preset d-axis current, and a q-axis current is zero.

In a possible implementation, the method further includes the following operation:
determining the excitation current based on the temperature of the power battery pack, and a value of the excitation current is negatively correlated with the temperature of the power battery pack.

In a possible implementation, the method further includes the following operation:
determining the excitation current according to a heating instruction, and the heating instruction indicates a value of the excitation current.

In a possible implementation, the method further includes the following operation:
determining the first preset d-axis current based on the temperature of the power battery pack, and a value of the first preset d-axis current is negatively correlated with the temperature of the power battery pack.

In a possible implementation, the method further includes the following operation:
determining the first preset d-axis current according to a heating instruction, and the first preset d-axis current indicates a value of the excitation current.

In a possible implementation, the controlling a direct current-direct current conversion circuit of the electric drive system may include the following operations:

determining an amplitude value and a phase of an input current of an each-phase motor winding based on the first preset d-axis current;

determining an amplitude value and a phase of an input voltage of the each-phase motor winding based on the amplitude value and the phase of the input current of the each-phase motor winding and an impedance of the each-phase motor winding;

determining a duty cycle of a control signal of the inverter circuit based on the amplitude value of the input voltage; and determining a sending time of the control signal of the inverter circuit based on the phase of the input voltage.

In a possible implementation, the controlling an inverter circuit of the electric drive system, and controlling a direct current-direct current conversion circuit of the electric drive system may include the following operation:

when it is determined that an electric vehicle is in motion and the temperature of the power battery pack is lower than the first temperature threshold, controlling the direct current-direct current conversion circuit to increase an excitation current output to the excitation winding, controlling the inverter circuit to increase the three-phase currents output to the three-phase motor windings, and enabling output torque of the electric excitation synchronous motor to be currently required torque.

In a possible implementation, the controlling a direct current-direct current conversion circuit of the electric drive system may include the following operations:

determining an amplitude value and a phase of an input current of an each-phase motor winding based on the currently required torque;

determining an amplitude value and a phase of an input voltage of the each-phase motor winding based on the amplitude value and the phase of the input current of the each-phase motor winding and an impedance of the each-phase motor winding;

determining a duty cycle of a control signal of the inverter circuit based on the amplitude value of the input voltage; and determining a sending time of the control signal of the inverter circuit based on the phase of the input voltage.

In a possible implementation, the method further includes the following operation:

when it is determined that a rotor temperature of the electric excitation synchronous motor is greater than a second temperature threshold, controlling the direct current-direct current conversion circuit to reduce the excitation current.

In a possible implementation, the method further includes the following operation:

when it is determined that a stator temperature of the electric excitation synchronous motor is greater than a third temperature threshold, controlling the inverter circuit to maintain the q-axis current at zero, and reducing the first preset d-axis current.

In a possible implementation, the method further includes the following operation:

when it is determined that a rotor temperature of the electric excitation synchronous motor is greater than a second temperature threshold, controlling the direct current-direct current conversion circuit to reduce the excitation current, and controlling the inverter circuit to increase the three-phase currents.

In a possible implementation, the method further includes the following operation:

when it is determined that a stator temperature of the electric excitation synchronous motor is greater than a third temperature threshold, controlling the inverter circuit to reduce the three-phase currents, and controlling the direct current-direct current conversion circuit to increase the excitation current.

According to a fourth aspect, the embodiments may further provide an electric vehicle. The electric vehicle includes the powertrain provided in the foregoing embodiments, and further includes a power battery pack. An output end of the power battery pack is connected to an input end of an electric drive system, and the power battery pack is configured to provide a direct current for the powertrain.

According to the electric vehicle, heating power of windings of three phases is adjusted by adjusting three-phase currents output by an inverter circuit, heating power of an excitation winding is adjusted by adjusting an excitation current output by a direct current-direct current conversion circuit, and the power battery pack is heated by using heat generated by the three-phase windings and the excitation winding and heat generated by a power switching component in the electric drive system without adding an additional heating apparatus. This reduces costs of the electric vehicle. Heating power consumption can further be adjusted by adjusting values of the three-phase currents and the excitation current, to make full use of a heating capability of the electric excitation synchronous motor. Therefore, heating efficiency of the power battery pack is further improved.

DETAILED DESCRIPTION OF THE EMBODIMENTS

To make a person skilled in the art better understand the embodiments, the following first describes a working principle of an electric drive system of an electric vehicle.

Figure 1:
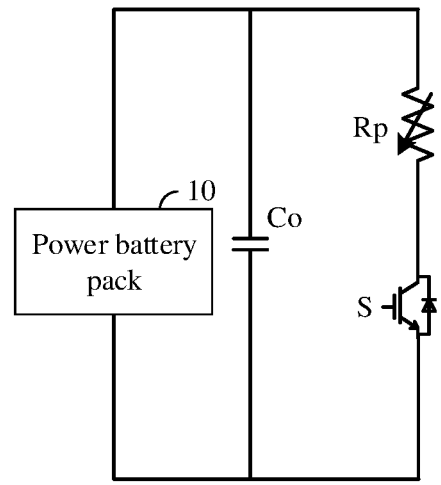
FIG. 1 is a schematic diagram of a heating apparatus of a power battery pack according to the conventional technology.
Figure 2:
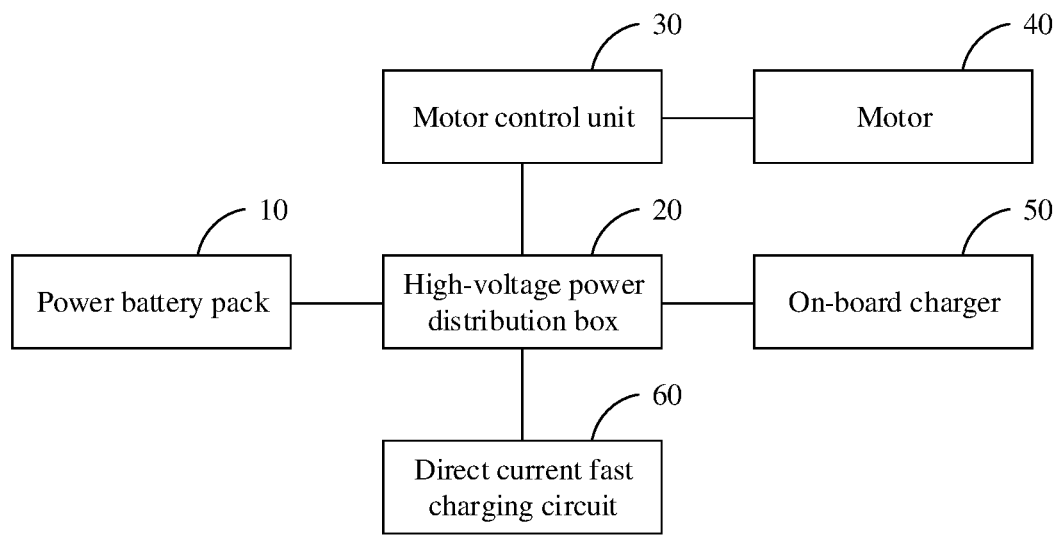
FIG. 2 is a schematic diagram of an example electric drive system of an electric vehicle according.

FIG. 2 is a schematic diagram of an example electric drive system of an electric vehicle.

An electric drive system shown in the figure includes a power battery pack 10, a high-voltage power distribution box 20, a motor control unit (MCU) 30, a motor 40, an on-board charger (OBC) 50, and a direct current fast charging circuit 60.

The power battery pack 10 is configured to provide a high-voltage direct current, and the high-voltage direct current provided by the power battery pack 10 is converted into an alternating current after passing through the high-voltage power distribution box 20 and the motor control unit 30 and is provided for the motor 40 to drive the electric vehicle.

When the power battery pack 10 is charged, in some embodiments, in this case, the on-board charger 50 is connected to an alternating current power supply, and the alternating current power supply may be a mains supply or an alternating current charging pile.

In some other embodiments, the electric vehicle charges the power battery pack 10 by using the direct current fast charging circuit 60. In this case, the direct current fast charging circuit 60 is connected to a direct current charging pile, and this charging manner is also referred to as "direct current fast charging".

Figure 3:
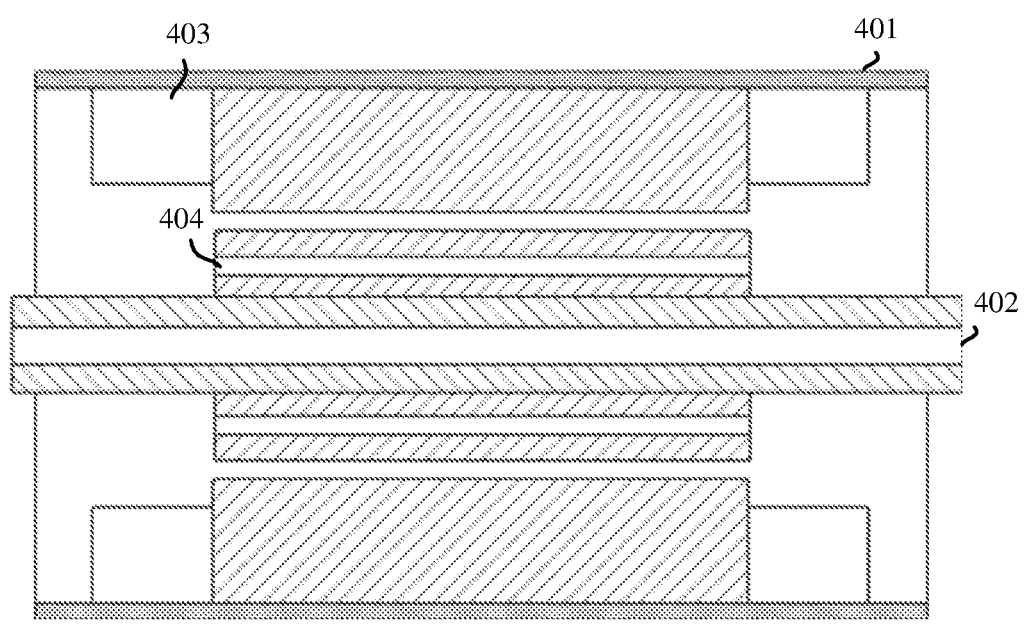
FIG. 3 is a schematic diagram of a structure of an example motor according to an embodiment.

FIG. 3 is a schematic diagram of a structure of an example motor according to an embodiment.

A motor 40 includes a housing 401, a rotating shaft 402, a stator 403, and a rotor 404.

A cooling loop is disposed in an iron core of the rotor 404, the housing 401, and the rotating shaft 402 of the motor 40, and a cooling working medium remains in the cooling loop and can circulate in the cooling loop. The cooling working medium is configured to cool the motor 40 and can also lubricate internal motor components including bearings. The cooling working medium can enter and exit a cavity of the motor from the housing of the motor or from two ends of the motor.

The stator 403 of the motor is a stationary part of the motor and may include an iron core and a stator winding.

The rotor 404 of the motor is a rotating component of the motor for converting electric energy into mechanical energy.

The embodiments may provide an electric excitation synchronous motor. When the motor 40 is the electric excitation synchronous motor, the stator winding is windings of three phases same as a common asynchronous motor or a permanent-magnet synchronous motor. The rotor is a cable winding structure, that is, including an excitation winding, and a rotor current is independent of a stator current and can be freely adjusted. An excitation current of the electric excitation synchronous motor is an independently adjustable direct current on the rotor.

Currently, a commonly used analysis method for three-phase currents of the motor 40 is Park transformation, which transforms a stationary three-phase coordinate into a d-q axis coordinate, thereby simplifying analysis. The d axis is also known as a direct axis, and the d axis is parallel to the rotating shaft (magnetic pole axis) of the motor. The q axis also known as a quadrature axis, is perpendicular to the magnetic pole axis of the motor, that is, perpendicular to the d axis.

A power battery pack can be heated by disposing an additional heating apparatus, but the heating apparatus increases extra space occupation and increases hardware costs. In addition, the heating apparatus also has problems such as uneven heating and low heating efficiency and cannot effectively increase a temperature of the power battery pack, and therefore cannot effectively improve electrochemical performance of the power battery pack.

To resolve the problems, the embodiments may provide a motor control unit, a powertrain, a heating method, and an electric vehicle, to heat a power battery pack by using heat generated by windings of three phases and an excitation winding and heat generated by a power switching component in an electric drive system without adding an additional heating apparatus. This reduces costs and saves space.

When the power battery pack is heated by using the solution, no additional heating apparatus needs to be added, which reduces costs and saves space.

The following describes the embodiments with reference to the accompanying drawings.

Terms such as "first" and "second" in description are merely intended for a purpose of description and shall not be understood as an indication or implication of relative importance or an implicit indication of a quantity of indicated features.

The term "connection" should be understood in a broad sense unless otherwise expressly specified and limited. For example, the "connection" may be a fastened connection, may be a detachable connection, or an integral connection; may be a direct connection, or may be an indirect connection implemented by using an intermediate medium.

The motors in the following description are electric excitation synchronous motors.

Figure 4:
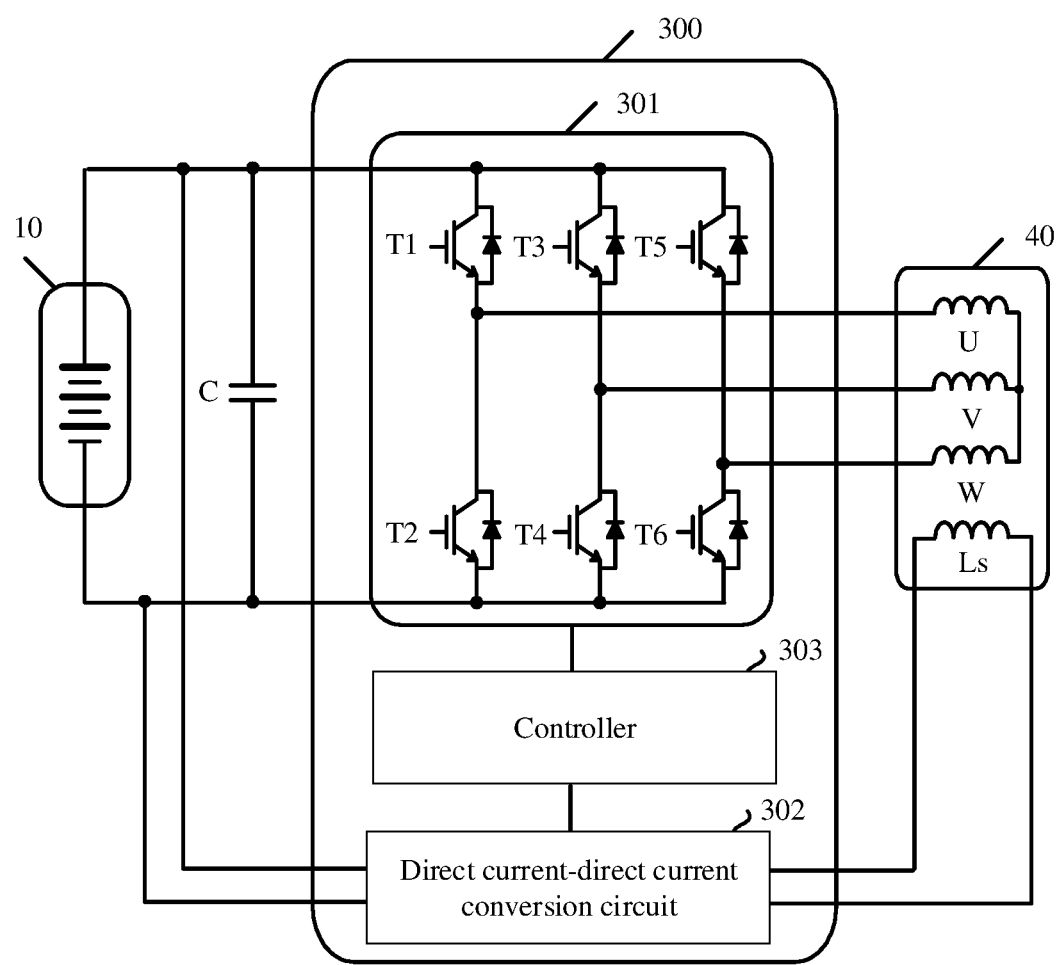
FIG. 4 is a schematic diagram of a motor control unit according to an embodiment.

FIG. 4 is a schematic diagram of a motor control unit according to an embodiment.

A motor control unit 300 shown in the figure includes an inverter circuit 301, a direct current-direct current conversion circuit 302, and a controller 303.

An input end of the inverter circuit 301 is connected to an input end of the motor control unit 300, and an output end of the inverter circuit 301 is connected to three-phase windings (in the figure, the three phases are respectively indicated by U, V, and W) of an electric excitation synchronous motor 40.

The inverter circuit may be a three-phase two-level inverter circuit or a three-phase three-level inverter circuit. This is not limited in this embodiment. For ease of description, the following uses the three-phase two-level inverter circuit as an example. In this case, the inverter circuit 301 includes controllable switching components T1 to T6. T1 and T2 are located on a same inverter bridge arm, T3 and T4 are located on a same inverter bridge arm, and T5 and T6 are located on a same inverter bridge arm. Midpoints of the three inverter bridge arms are respectively connected to input ends of the three-phase windings. The inverter circuit 301 is configured to: convert a direct current provided by a power battery pack 10 into an alternating current and provide the alternating current for the three-phase windings.

An input end of the direct current-direct current conversion circuit 302 is connected to the input end of the motor control unit, and an output end of the direct current-direct current conversion circuit 302 is connected to an excitation winding Ls of the electric excitation synchronous motor 40.

The direct current-direct current conversion circuit 302 is configured to: perform direct current conversion on the direct current and provide the direct current for the excitation winding Ls.

According to the embodiment, heat generated by the motor control unit 300 and the electric excitation synchronous motor 40 is used to heat the power battery pack, which is described below.

The inverter circuit 301 and the direct current-direct current conversion circuit 302 include power switching components, and the power switching component may be an IGBT, an MOSFET (MOS for short, including an NMOS and a PMOS), an SiC MOSFET, or the like. This is not limited in this embodiment. The power switching component generates heat during working, and this part of heat can be used to heat the power battery pack.

For the electric excitation synchronous motor 40, power losses may include a copper loss, an iron loss, a magnet loss, and the like, and the power loss indicates conversion of this part of electric energy into heat energy.

The copper loss refers to heat generated by a current passing through a copper conductor. Heating power of the copper loss is $P1=I_1^2 \cdot R_1$, where $I_1$ is the current flowing through the copper conductor, and $R_1$ is a resistance of the copper conductor.

The iron loss is a loss that is of ferromagnetic materials, such as steel and a silicon steel sheet, and that is generated in an alternating magnetic field, including a magnetic hysteresis loss, an eddy current loss, and an additional loss.

The magnet loss is generated due to a fact that a magnet material of the electric excitation synchronous motor 40 has electric conductivity, which induces an eddy current in an alternating magnetic field, and thereby generates a corresponding eddy current loss.

The power battery pack is heated by the losses of the electric excitation synchronous motor 40.

The controller 303 is configured to control the inverter circuit 301 and the direct current-direct current conversion circuit 302, to adjust currents of three phase output by the inverter circuit 301 and adjust an excitation current output by the direct current-direct current conversion circuit 302, to enable a temperature of the power battery pack to be greater than or equal to a first temperature threshold.

The controller 303 in this embodiment may be an ASIC, a PLD, a DSP, or a combination thereof. The PLD may be a CPLD, an FPGA, a GAL, or any combination thereof. This is not limited in this embodiment. In a possible implementation, a control signal is a PWM signal.

In some embodiments, the inverter circuit 301 is integrated in the motor control unit 30 shown in FIG. 2. The direct current-direct current conversion circuit 302 may be integrated in the motor control unit 30 or may be separately disposed. This is not limited in this embodiment.

In conclusion, according to the embodiment, heating power of the three-phase windings can be adjusted by adjusting the three-phase currents output by the inverter circuit, and heating power of the excitation winding can be adjusted by adjusting the excitation current output by the direct current-direct current conversion circuit. The power battery pack is heated by using heat generated by the three-phase windings and the excitation winding and heat generated by the power switching components in the electric drive system without adding an additional heating apparatus. This reduces costs and saves space. In addition, heating power consumption can further be adjusted by adjusting values of the three-phase currents and the excitation current, to make full use of a heating capability of the electric excitation synchronous motor. Therefore, heating efficiency of the power battery pack is further improved. When the power battery pack outputs a current, an internal resistance of the power battery pack heats up, and this part of heat can also heat the power battery pack.

The following describes a manner in which the electric drive system heats the power battery pack.

Figure 5:
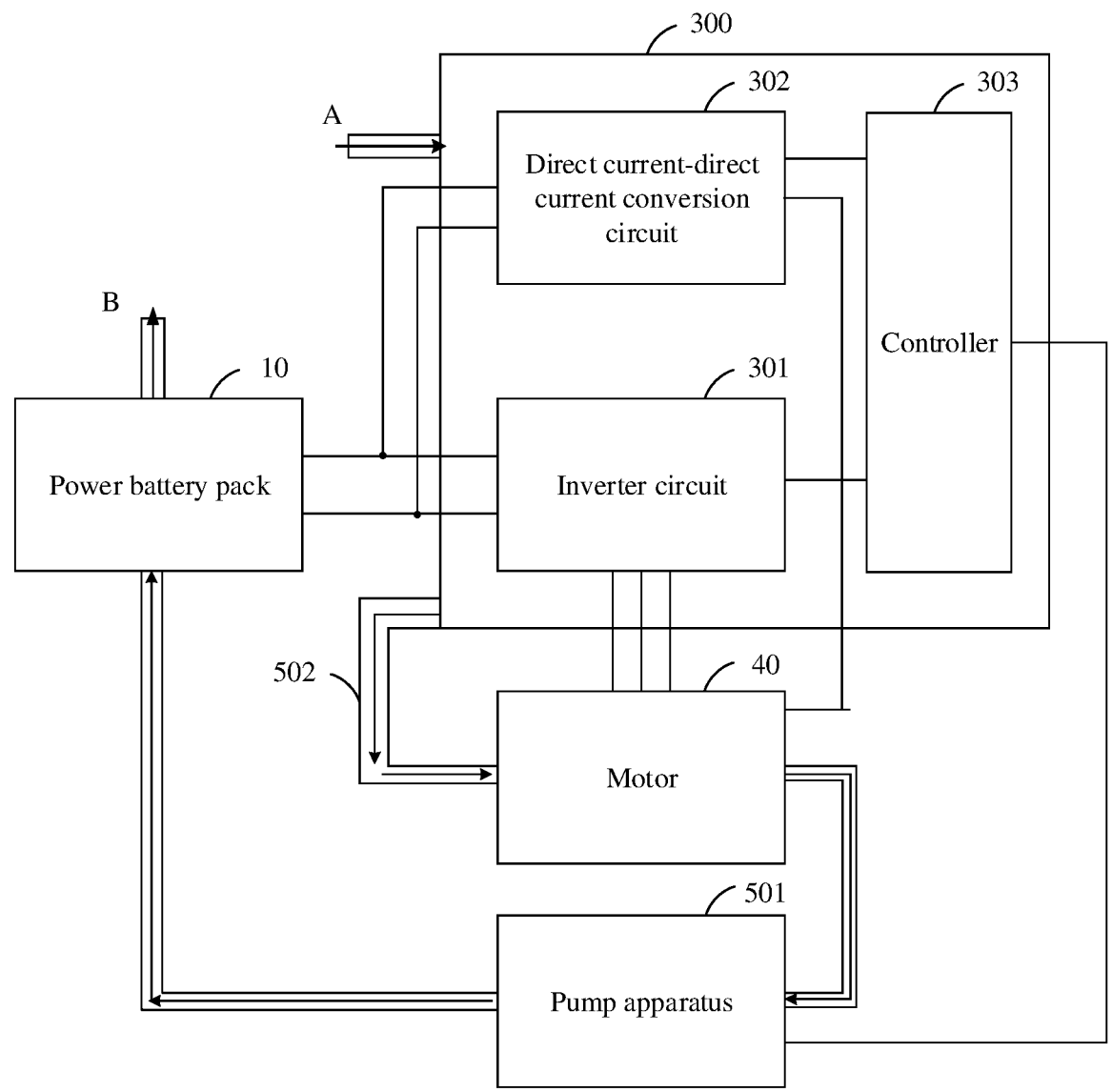
FIG. 5 is a schematic diagram of a cooling system according to an embodiment.

FIG. 5 is a schematic diagram of a cooling system according to an embodiment.

The electric drive system further includes a cooling system, and a cooling system shown in the figure includes a pump apparatus 501 and a cooling loop 502.

The following describes a process of heating the power battery pack.

The cooling loop 502 includes a cooling working medium, and a circulation direction of the cooling working medium is shown by arrows in the figure. The cooling loop 502 performs heat exchange on the inverter circuit 301 and the motor 40, to absorb heat. In some other embodiments, the cooling loop is further configured to perform the heat exchange on the direct current-direct current conversion circuit 302 to absorb heat. When the cooling working medium flows through the power battery pack 10, the heat is transferred to the power battery pack if the temperature of the power battery pack 10 is lower than the cooling working medium.

The pump apparatus 501 is configured to drive the cooling working medium in the cooling loop 502 to circulate.

The cooling working medium in the cooling loop 502 flows from point A, and the cooling working medium reaches point B after heating the power battery pack 10. In some embodiments, the point A and the point B may be connected to a radiator, a heat dissipation system, another heat exchanger, or the like of an electric vehicle, to form a loop. This is not limited in this embodiment.

The following describes a process of generating heat by the electric drive system.

Figure 6:
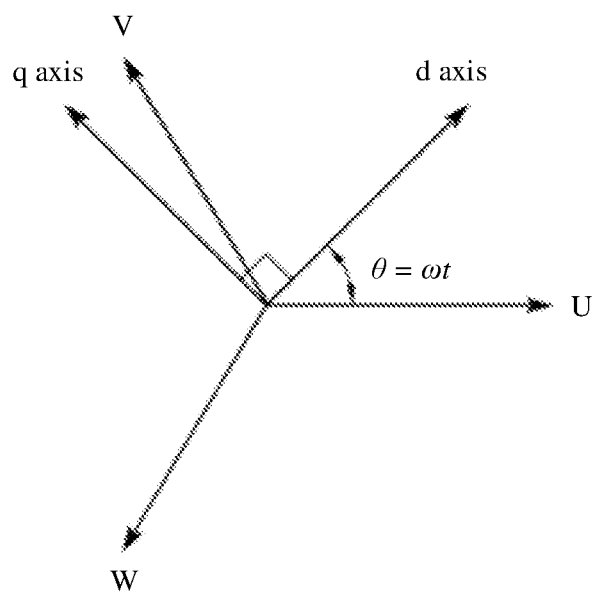
FIG. 6 is a schematic diagram of three-phase currents according to an embodiment.

FIG. 6 is a schematic diagram of three-phase currents according to an embodiment.

t indicates time, ω indicates frequency of a signal, and iu(t), iv(t), and iw(t) respectively indicate instantaneous directions of the currents of the three phases U, V, and W. id indicates a d-axis current, and a relationship is as follows:

$$\begin{cases} iu(t) = id \cdot \text{COS}(\omega t) \\ iv(t) = -\frac{1}{2} \cdot id \cdot \text{COS}(\omega t) \\ iw(t) = -\frac{1}{2} \cdot id \cdot \text{COS}(\omega t) \end{cases} \quad (1)$$

For torque Te of the motor, a correspondence is as follows:

$$Te = \propto [\Psi_f i_q + (L_d - L_q) \cdot i_d i_q] \quad (2)$$

$\Psi_f$ is flux of a rotor, $i_d$ is the d-axis current, $i_q$ is a q-axis current, $L_d$ is a d-axis inductance, and $L_q$ is a q-axis inductance.

In a first implementation, when determining that the temperature of the power battery pack 10 is lower than a preset temperature, the controller 303 starts to heat the power battery pack. In this case, in some embodiments, the controller 303 obtains current temperature information of the power battery pack 10 by using a battery management system (BMS). In some other embodiments, the controller 303 obtains the current temperature information of the power battery pack 10 by using a vehicle control unit (VCU). The temperature information indicates a current temperature of the power battery pack.

In a second implementation, the controller heats the power battery pack according to an obtained heating instruction. At this time, a driver can determine a heating level (for example, a higher heating level indicates a faster heating rate) of the power battery pack based on a requirement or adjust heating time (shorter heating time indicates a higher heating level) of the power battery pack. In response to an input operation of the driver, the VCU determines a corresponding heating instruction with reference to the current temperature information of the power battery pack, and sends the heating instruction to the controller, where the heating instruction is used to instruct the electric drive system to heat the power battery pack. The temperature information of the power battery pack is sent from the BMS to the VCU.

The following describes heating manners of the electric vehicle in different states.

When the electric vehicle is in a stationary state, heating can be performed in the following manners:

(a) The controller 303 controls the direct current-direct current conversion circuit 302 to output an excitation current Is, to enable the excitation winding of the motor to generate heat. A larger excitation current indicates higher heating power of the excitation winding, and a faster heating speed of the power battery pack.

In this case, for the first implementation, a correspondence between a current temperature of the power battery pack 10 and a value of the excitation current Is is pre-calibrated, stored in a form of a data table, and invoked by the controller when used. Alternatively, a correspondence between a temperature difference and the value of the excitation current Is is pre-calibrated, stored in the form of the data table, and invoked by the controller when used, and the temperature difference indicates a difference between the preset temperature and a current temperature of the power battery pack.

For the second implementation, a correspondence between the heating instruction and a value of the excitation current Is is pre-calibrated, stored in a form of a data table, and invoked by the controller when used.

(b) The controller 303 controls the inverter circuit 301 to input a first preset d-axis current to the motor and controls the q-axis current that is input by the inverter circuit 301 to the motor to be zero. That is, in this case, iq=0. Refer to Formula (2). In this case, the torque Te of the motor is zero.

The controller determines an amplitude value and a phase of an input current of an each-phase motor winding based on the first preset d-axis current id and with reference to Formula (1); determines an amplitude value and a phase of an input voltage of the each-phase motor winding based on the amplitude value and the phase of the input current of the each-phase motor winding and an impedance of the each-phase motor winding; and determines a duty cycle of a control signal of the inverter circuit based on the amplitude value of the input voltage, and determines sending time of the control signal of the inverter circuit based on the phase of the input voltage. The impedance of the motor winding is an inherent parameter of the motor winding, and may be pre-determined and stored, and invoked by the controller when used.

In this case, for the first implementation, a correspondence between a current temperature of the power battery pack 10 and the first preset d-axis current id is pre-calibrated, stored in a form of a data table, and invoked by the controller when used. Alternatively, a correspondence between a temperature difference and the first preset d-axis current id is pre-calibrated, stored in the form of the data table, and invoked by the controller when used, and the temperature difference indicates a difference between the preset temperature and a current temperature of the power battery pack.

For the second implementation, a correspondence between the heating instruction and a value of the first preset d-axis current id is pre-calibrated, stored in a form of a data table, and invoked by the controller when used.

(c) The heating manners of (a) and (b) are simultaneously used, to increase the heating speed.

In the heating manners, when determining that the power battery pack is heated, the controller adjusts the d-axis current and the q-axis current to zero and prepares to start the electric vehicle.

When the electric vehicle is in a stationary state, heating can be performed in the following manners:

(d) The controller controls the q-axis current that is input by the inverter circuit 301 to the motor to be zero. Still refer to Formula (2). That is, in this case, the motor has no output torque. The controller determines an amplitude value and a phase of an input current of an each-phase motor winding based on the first preset d-axis current id and with reference to Formula (1); determines an amplitude value and a phase of an input voltage of the each-phase motor winding based on the amplitude value and the phase of the input current of the each-phase motor winding and an impedance of the each-phase motor winding; and determines a duty cycle of a control signal of the inverter circuit based on the amplitude value of the input voltage, and determines sending time of the control signal of the inverter circuit based on the phase of the input voltage. The impedance of the motor winding is an inherent parameter of the motor winding, and may be pre-determined and stored, and invoked by the controller when used.

For the first implementation, a correspondence between a current temperature of the power battery pack 10 and the first preset d-axis current id is pre-calibrated, stored in a form of a data table, and invoked by the controller when used. Alternatively, a correspondence between a temperature difference and the first preset d-axis current id is pre-calibrated, stored in the form of the data table, and invoked by the controller when used, and the temperature difference indicates a difference between the preset temperature and a current temperature of the power battery pack.

For the second implementation, a correspondence between the heating instruction and a value of the first preset d-axis current id is pre-calibrated, stored in a form of a data table, and invoked by the controller when used.

The controller may further control the direct current-direct current conversion circuit 302 to output the excitation current Is, for example, increase the excitation current Is to increase the heating rate. For a method for controlling the excitation current Is, refer to the foregoing descriptions, and details are not described again in this embodiment.

(e) The controller 303 controls a working state of the inverter circuit 301, so that the torque output by the motor is maintained at currently required torque and the d-axis current of the motor is increased. In some embodiments, the currently required torque is determined by the VCU, and the VCU sends torque information to the controller 303, so that the controller determines a currently required q-axis current and a currently required d-axis current based on the torque information. The torque information and a corresponding q-axis current and a corresponding d-axis current can be pre-calibrated.

Maximum torque per ampere (MTPA) control may be used for the electric vehicle in a driving process. The MTPA control requires a minimum motor current to generate maximum electromagnetic torque, and a current optimal q-axis current and a current optimal d-axis current to be determined, to improve motor efficiency. The d-axis current of the motor may be increased, so that the motor is no longer controlled by using MTPA. In this case, the motor current is no longer the minimum current, but increases. Therefore, power consumption of the motor increases, and heat generated by the motor increases, thereby improving heating efficiency of the power battery pack.

In some embodiments, to increase the heating rate, the motor current may be adjusted to a maximum value.

In some embodiments, the controller determines the q-axis current and the d-axis current based on currently output torque, and determines an amplitude value and a phase of an input current of an each-phase motor winding based on the q-axis current and the d-axis current; determines an amplitude value and a phase of an input voltage of the each-phase motor winding based on the amplitude value and the phase of the input current of the each-phase motor winding and an impedance of the each-phase motor winding; and determines a duty cycle of a control signal of the inverter circuit based on the amplitude value of the input voltage, and determines sending time of the control signal of the inverter circuit based on the phase of the input voltage.

The impedance of the motor winding is an inherent parameter of the motor winding, and may be pre-determined and stored, and invoked by the controller when used.

The controller may further control the direct current-direct current conversion circuit 302 to output the excitation current Is, for example, increase the excitation current Is, to increase the heating rate.

Further, in some embodiments, in the process of heating the power battery pack, the following protection measures may be used to avoid overheating of the motor, to improve safety:
(f) When the electric vehicle is in a stationary state (parking state) or the motor has no output torque, and when a rotor temperature is greater than a second temperature threshold, the controller 303 controls the direct current-direct current conversion circuit 302 to reduce the output excitation current Is.

When a stator temperature is greater than a third temperature threshold, the controller 303 controls the inverter circuit 301 to reduce the three-phase currents output to the windings of three phases, that is, reduce the first preset d-axis current and maintain the q-axis current at zero.
(g) When the electric vehicle outputs torque, it needs to be ensured that driving torque remains unchanged. In this case, when a rotor temperature is greater than a second temperature threshold, the controller 303 controls the direct current-direct current conversion circuit 302 to reduce the output excitation current Is. To maintain the heating rate for the power battery pack, the controller 303 may further control the inverter circuit 301 to increase the three-phase currents output to the three-phase motor windings.

When a stator temperature is greater than a third temperature threshold, the controller 303 controls the inverter circuit 301 to reduce the three-phase currents output to the windings of three phases. To maintain the heating rate for the power battery pack, the controller 303 may further control the direct current-direct current conversion circuit 302 to increase the output excitation current Is.

When the temperatures of both the stator and the rotor are overheated, the controller 303 controls both the excitation current and the three-phase currents to decrease.

In the foregoing embodiments, the inverter circuit 301 may be the three-phase two-level inverter circuit or the three-phase three-level inverter circuit. This is not limited in this embodiment. A working principle and implementation of the inverter circuit are mature technologies, and details are not described in this embodiment.

It may be understood that the controller 303 may determine a running state of the electric vehicle according to a running instruction sent by the VCU, and further select a corresponding control manner.

The first temperature threshold, the second temperature threshold, and the third temperature threshold in the foregoing descriptions may be set based on an actual situation. This is not limited in this embodiment.

In a possible implementation, the controller is further configured to determine the excitation current based on the temperature of the power battery pack, and a value of the excitation current is negatively correlated with the temperature of the power battery pack.

In a possible implementation, the controller is further configured to determine the first preset d-axis current based on the temperature of the power battery pack, and a value of the first preset d-axis current is negatively correlated with the temperature of the power battery pack.

In conclusion, according to the electric drive system provided in this embodiment, the heating power of the three-phase windings is adjusted by adjusting the three-phase currents output by the inverter circuit, the heating power of the excitation winding is adjusted by adjusting the excitation current output by the direct current-direct current conversion circuit, and the power battery pack is heated by using the heat generated by the three-phase windings and the excitation winding and the heat generated by the power switching components in the electric drive system without adding the additional heating apparatus. This reduces the costs and saves the space. The heating power consumption can further be adjusted by adjusting the values of the three-phase currents and the excitation current, to make full use of the heating capability of the electric excitation synchronous motor. Therefore, the heating efficiency of the power battery pack is further improved.

An embodiment may further provide a method for heating a power battery pack, which is described below with reference to the accompanying drawings.

The method includes the following steps: controlling an inverter circuit of an electric drive system and controlling a direct current-direct current conversion circuit of the electric drive system, so that a temperature of the power battery pack is greater than or equal to a first temperature threshold.

For an implementation and working principle of the electric drive system, refer to the related descriptions in the foregoing embodiments, and details are not described again in this embodiment.

The following provides description with reference to an implementation.

Figure 7:
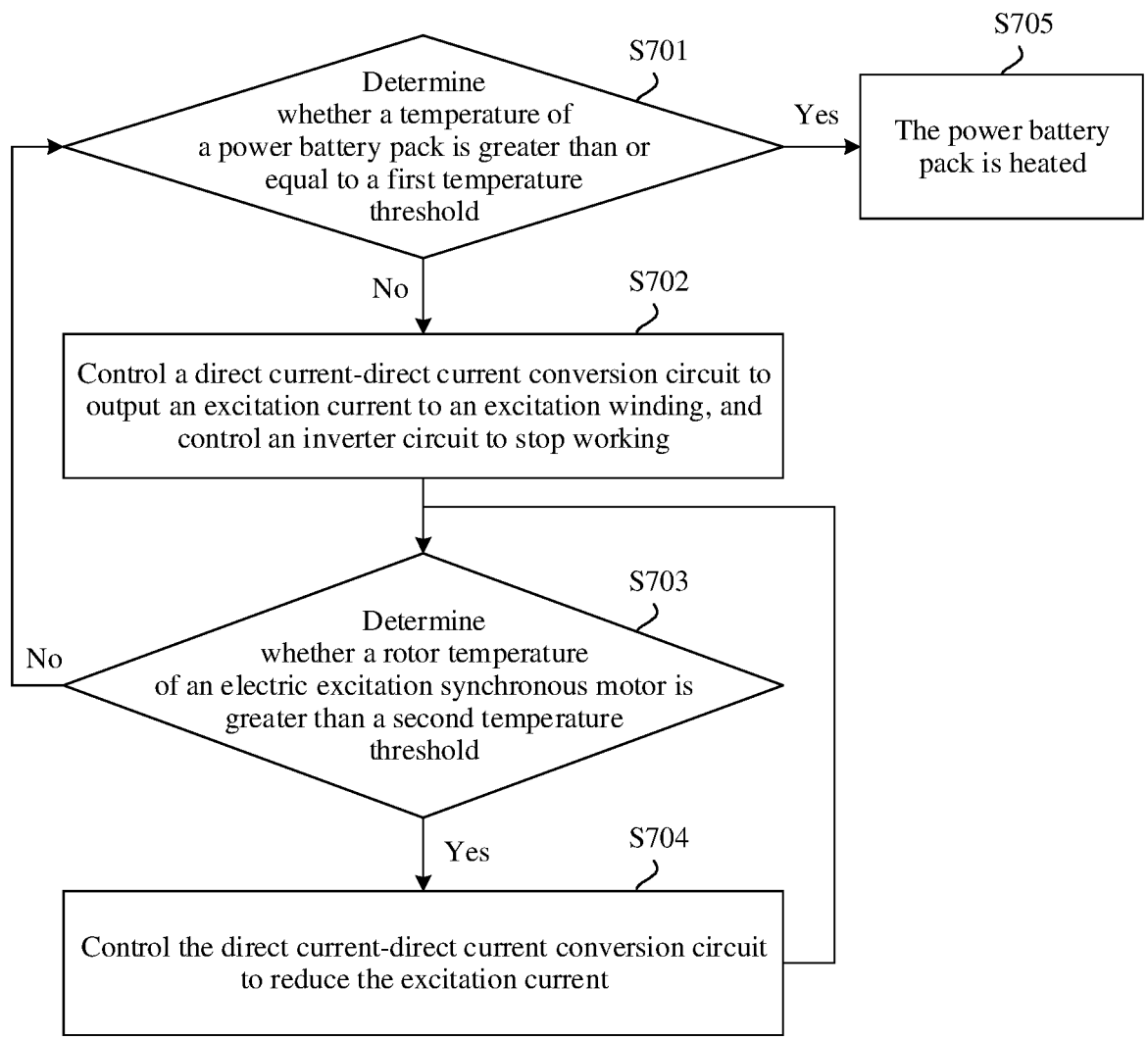
FIG. 7 is a schematic flowchart of a method for heating a power battery pack according to an embodiment.

FIG. 7 is a schematic flowchart of a method for heating a power battery pack according to an embodiment.

The method can be applied to an electric vehicle in a stationary state and an electric vehicle in motion but without torque output, and the method includes the following steps:
S701: Determine whether a temperature of a power battery pack is greater than or equal to a first temperature threshold.

If the temperature of the power battery pack is not greater than or equal to the first temperature threshold, it indicates that the temperature of the power battery pack is low at this time, and heating needs to be performed, and S702 is performed; or if the temperature of the power battery pack is greater than or equal to the first temperature threshold, it indicates that the power battery pack is heated at this time, and S705 is performed.

S702: Control a direct current-direct current conversion circuit to output an excitation current to an excitation winding and control an inverter circuit to stop working.

In this case, a larger excitation current indicates higher heating power of the excitation winding, and a faster heating speed of the power battery pack.

In some embodiments, the following step is further included: determining the excitation current based on the temperature of the power battery pack, and a value of the excitation current is negatively correlated with the temperature of the power battery pack.

A correspondence between the temperature of the power battery pack and the value of the excitation current is pre-calibrated, stored in a form of a data table, and invoked by a controller when used. Alternatively, a correspondence between a temperature difference and the value of the excitation current is pre-calibrated, stored in a form of a data table, and invoked when used. The temperature difference indicates a difference between a preset temperature and a current temperature of the power battery pack.

In some other embodiments, the following step is further included: determining the excitation current according to a heating instruction, and the heating instruction indicates a value of the excitation current.

A correspondence between the heating instruction and the value of the excitation current is pre-calibrated, stored in a form of a data table, and invoked when used.

S703: Determine whether a rotor temperature of an electric excitation synchronous motor is greater than a second temperature threshold.

If the rotor temperature of the electric excitation synchronous motor is greater than the second temperature threshold, it indicates that the rotor of the motor has an overheating risk at this time, and S704 is performed. Otherwise, the power battery pack continues to be heated, and S701 is performed.

S704: Control the direct current-direct current conversion circuit to reduce the excitation current.

The rotor temperature can be less than or equal to the second temperature threshold by appropriately reducing the excitation current.

S705: The power battery pack is heated.

Another method for heating the power battery pack is described below with reference to the accompanying drawings.

Figure 8:
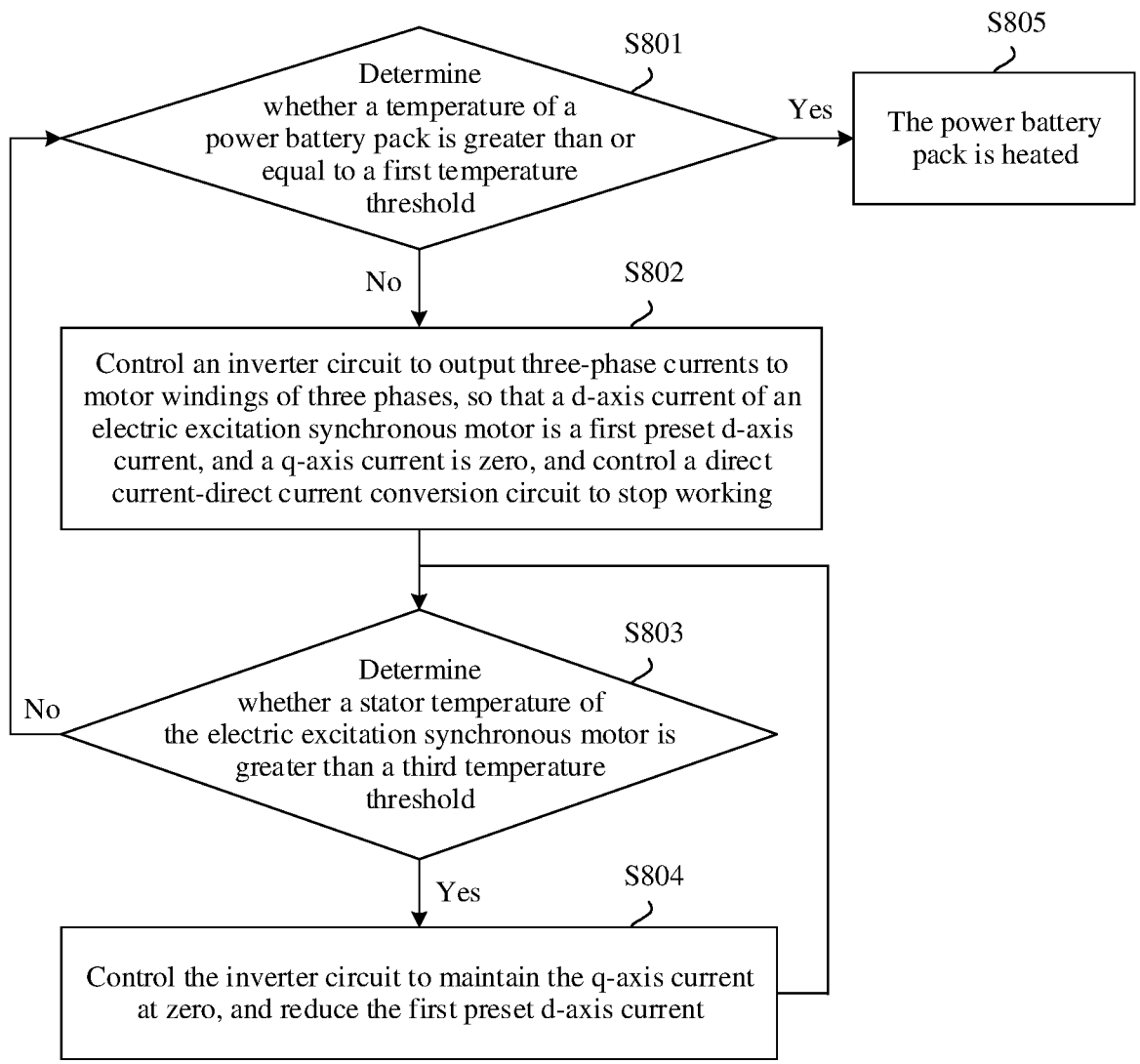
FIG. 8 is a schematic flowchart of another method for heating a power battery pack according to an embodiment.

FIG. 8 is a schematic flowchart of another method for heating a power battery pack according to an embodiment.

The method can be applied to an electric vehicle in a stationary state and an electric vehicle in motion but without torque output, and the method includes the following steps:

S801: Determine whether a temperature of a power battery pack is greater than or equal to a first temperature threshold.

If the temperature of the power battery pack is not greater than or equal to the first temperature threshold, it indicates that the temperature of the power battery pack is low at this time, and heating needs to be performed, and S802 is performed; or if the temperature of the power battery pack is greater than or equal to the first temperature threshold, it indicates that the power battery pack is heated at this time, and S805 is performed.

S802: Control an inverter circuit to output three-phase currents to three-phase motor windings, so that a d-axis current of an electric excitation synchronous motor is a first preset d-axis current, and a q-axis current is zero, and control a direct current-direct current conversion circuit to stop working.

In some embodiments, the following step is further included: determining the first preset d-axis current based on the temperature of the power battery pack, and a value of the first preset d-axis current is negatively correlated with the temperature of the power battery pack.

A correspondence between a current temperature of the power battery pack and the first preset d-axis current is pre-calibrated, stored in a form of a data table, and invoked by a controller when used. Alternatively, a correspondence between a temperature difference and the first preset d-axis current is pre-calibrated, stored in a form of a data table, and invoked when used. The temperature difference indicates a difference between a preset temperature and a current temperature of the power battery pack.

In some embodiments, the following step is further included: determining the first preset d-axis current according to a heating instruction, and the first preset d-axis current indicates a value of an excitation current.

A correspondence between the heating instruction and a value of the first preset d-axis current is pre-calibrated, stored in a form of a data table, and invoked when used.

Controlling the inverter circuit in S802 may include the following steps:
  determining an amplitude value and a phase of an input current of an each-phase motor winding based on the first preset d-axis current;
  determining an amplitude value and a phase of an input voltage of the each-phase motor winding based on the amplitude value and the phase of the input current of the each-phase motor winding and an impedance of the each-phase motor winding, where the impedance of the motor winding is an inherent parameter of the motor winding, and may be pre-determined and stored, and invoked by the controller when used; and
  determining a duty cycle of a control signal of the inverter circuit based on the amplitude value of the input voltage and determining sending time of the control signal of the inverter circuit based on the phase of the input voltage.

S803: Determine whether a stator temperature of the electric excitation synchronous motor is greater than a third temperature threshold.

If the stator temperature of the electric excitation synchronous motor is greater than the third temperature threshold, it indicates that the stator of the motor has an overheating risk at this time, and S804 is performed. Otherwise, the power battery pack continues to be heated, and S801 is performed.

S804: Control the inverter circuit to maintain the q-axis current at zero and reduce the first preset d-axis current.

S805: The power battery pack is heated.

Still another method for heating the power battery pack is described below with reference to the accompanying drawings.

Figure 9:
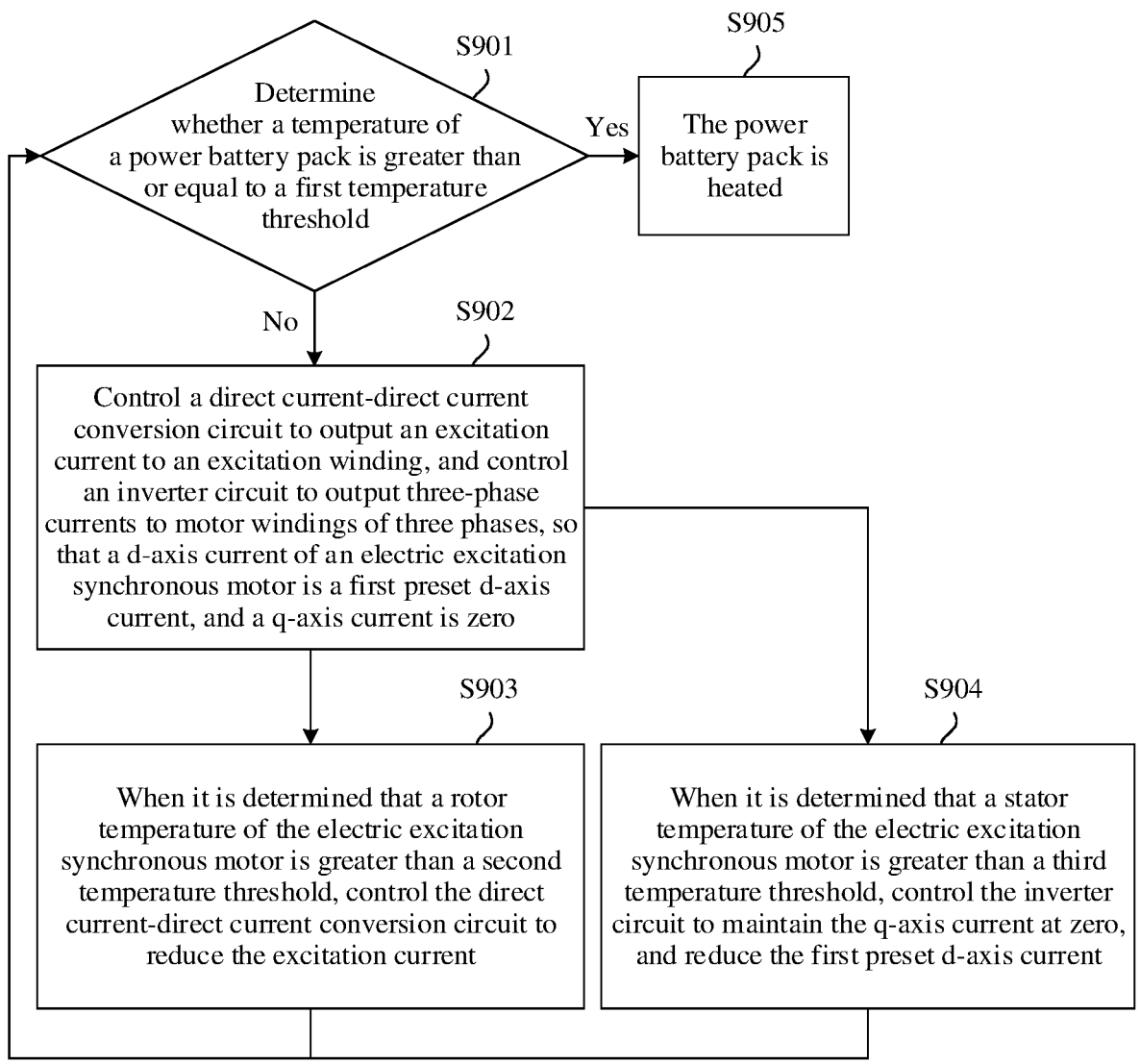
FIG. 9 is a schematic flowchart of still another method for heating a power battery pack according to an embodiment.

FIG. 9 is a schematic flowchart of still another method for heating a power battery pack according to an embodiment.

The method can be applied to an electric vehicle in a stationary state and an electric vehicle in motion but without torque output, and the method includes the following steps:

S901: Determine whether a temperature of a power battery pack is greater than or equal to a first temperature threshold.

S902: Control a direct current-direct current conversion circuit to output an excitation current to an excitation winding and control an inverter circuit to output three-phase currents to three-phase motor windings, so that a d-axis current of an electric excitation synchronous motor is a first preset d-axis current, and a q-axis current is zero.

S903: When it is determined that a rotor temperature of the electric excitation synchronous motor is greater than a second temperature threshold, control the direct current-direct current conversion circuit to reduce the excitation current.

S904: When it is determined that a stator temperature of the electric excitation synchronous motor is greater than a third temperature threshold, control the inverter circuit to maintain the q-axis current at zero, and reduce the first preset d-axis current.

S905: The power battery pack is heated.

Yet another method for heating the power battery pack is described below with reference to the accompanying drawings.

Figure 10:
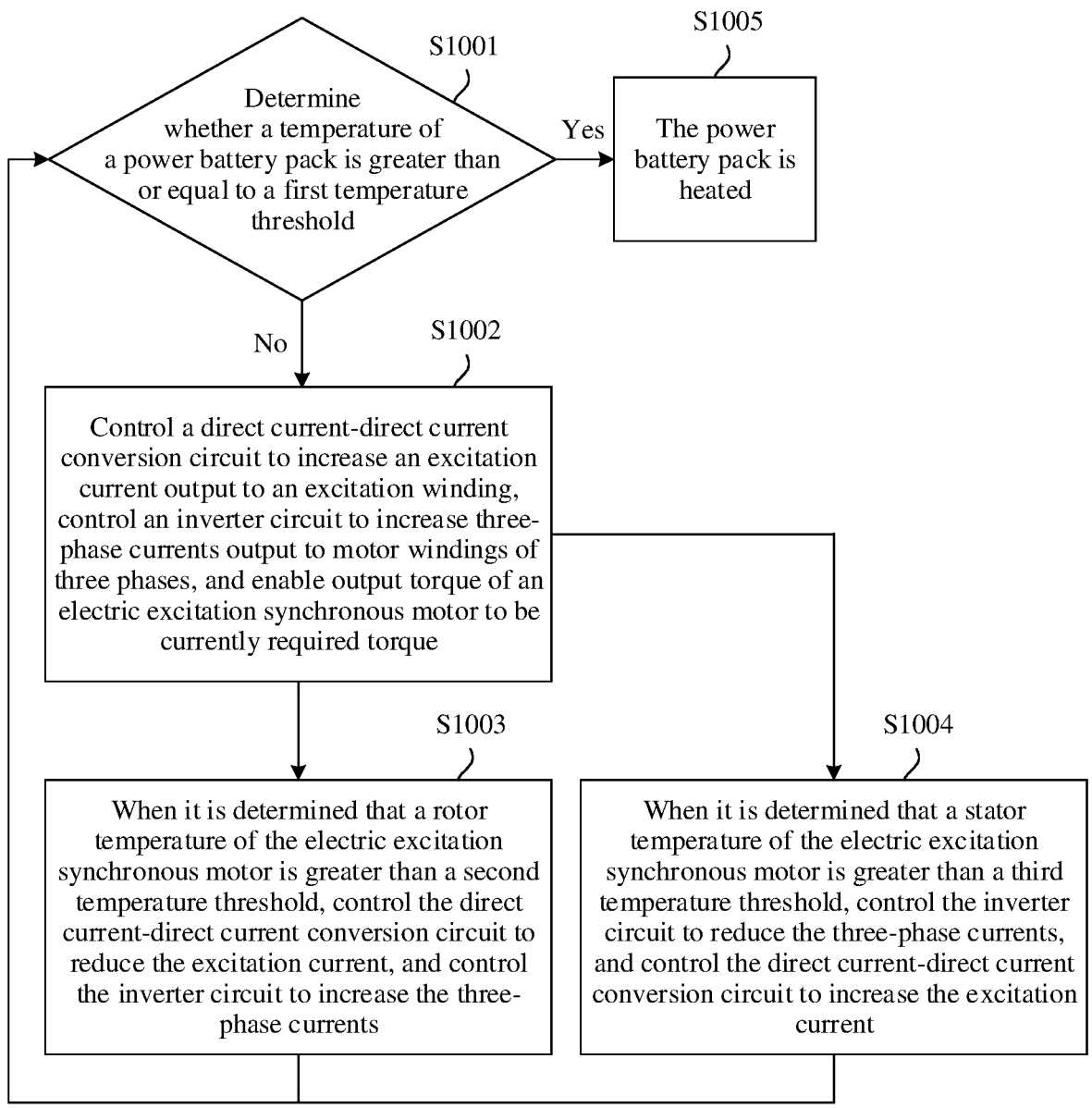
FIG. 10 is a schematic flowchart of yet another method for heating a power battery pack according to an embodiment.

FIG. 10 is a schematic flowchart of yet another method for heating a power battery pack according to an embodiment.

The method can be applied to an electric vehicle that is in motion and that has torque output, and the method includes the following steps:

S1001: Determine whether a temperature of a power battery pack is greater than or equal to a first temperature threshold.

S1002: Control a direct current-direct current conversion circuit to increase an excitation current output to an excitation winding, control an inverter circuit to increase three-phase currents output to three-phase motor windings, and enable output torque of an electric excitation synchronous motor to be currently required torque.

In some embodiments, to increase a heating rate, a motor current may be adjusted to a maximum value.

Controlling the direct current-direct current conversion circuit of an electric drive system may include the following steps:

determining an amplitude value and a phase of an input current of an each-phase motor winding based on the currently required torque;

determining an amplitude value and a phase of an input voltage of the each-phase motor winding based on the amplitude value and the phase of the input current of the each-phase motor winding and an impedance of the each-phase motor winding; and determining a duty cycle of a control signal of the inverter circuit based on the amplitude value of the input voltage and determining sending time of the control signal of the inverter circuit based on the phase of the input voltage.

The impedance of the motor winding is an inherent parameter of the motor winding, and may be pre-determined and stored, and invoked by a controller when used.

S1003: When it is determined that a rotor temperature of the electric excitation synchronous motor is greater than a second temperature threshold, control the direct current-direct current conversion circuit to reduce the excitation current and control the inverter circuit to increase the three-phase currents.

S1004: When it is determined that a stator temperature of the electric excitation synchronous motor is greater than a third temperature threshold, control the inverter circuit to reduce the three-phase currents and control the direct current-direct current conversion circuit to increase the excitation current.

S1005: The power battery pack is heated.

It may be understood that division into and a sequence of the foregoing steps are merely for ease of description, and do not constitute a limitation. A person skilled in the art may further obtain another equivalent implementation with reference to the embodiments. For example, S1003 and S1004 may be exchanged.

In conclusion, according to the heating methods provided in the embodiments, heating power of the three-phase windings is adjusted by adjusting the three-phase currents output by the inverter circuit, heating power of the excitation winding is adjusted by adjusting the excitation current output by the direct current-direct current conversion circuit, and the power battery pack is heated by using heat generated by the three-phase windings and the excitation winding and heat generated by a power switching component in the electric drive system without adding an additional heating apparatus. This reduces costs and saves space. Heating power consumption can further be adjusted by adjusting values of the three-phase currents and the excitation current, to make full use of a heating capability of the electric excitation synchronous motor. Therefore, heating efficiency of the power battery pack is further improved.

Based on the electric drive system provided in the foregoing embodiments, an embodiment may further provide a powertrain, which is described below with reference to the accompanying drawings.

Figure 11:
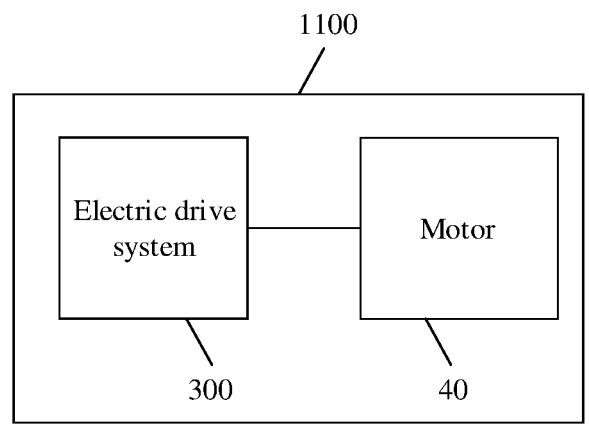
FIG. 11 is a schematic diagram of a powertrain according to an embodiment.

FIG. 11 is a schematic diagram of a powertrain according to an embodiment.

A powertrain 1100 includes an electric drive system 300 and a motor 40.

The motor 40 is an electric excitation synchronous motor. An input end of the motor 40 is connected to an output end of the electric drive system 300.

The motor 40 converts electric energy into mechanical energy to drive an electric vehicle.

For an implementation and working principle of the electric drive system 300, refer to the related descriptions in the foregoing embodiments, and details are not described again in this embodiment.

In conclusion, the powertrain provided in this embodiment includes the electric drive system provided in the foregoing embodiments. The electric drive system can implement heating of a power battery pack by using heat generated by the electric drive system and the electric excitation synchronous motor. Heating power of windings of three phases can be adjusted by adjusting three-phase currents output by an inverter circuit, heating power of an excitation winding can be adjusted by adjusting an excitation current output by a direct current-direct current conversion circuit, and the power battery pack is heated by using heat generated by the three-phase windings and the excitation winding and heat generated by a power switching component in the electric drive system without adding an additional heating apparatus. This reduces costs of the powertrain and saves space and facilitates development of the powertrain in directions of miniaturization and high integration. Heating power consumption can further be adjusted by adjusting values of the three-phase currents and the excitation current, to make full use of a heating capability of the electric excitation synchronous motor. Therefore, heating efficiency of the power battery pack is further improved.

Based on the electric drive system provided in the foregoing embodiments, an embodiment further provides an electric vehicle, which is described below with reference to the accompanying drawings.

Figure 12:
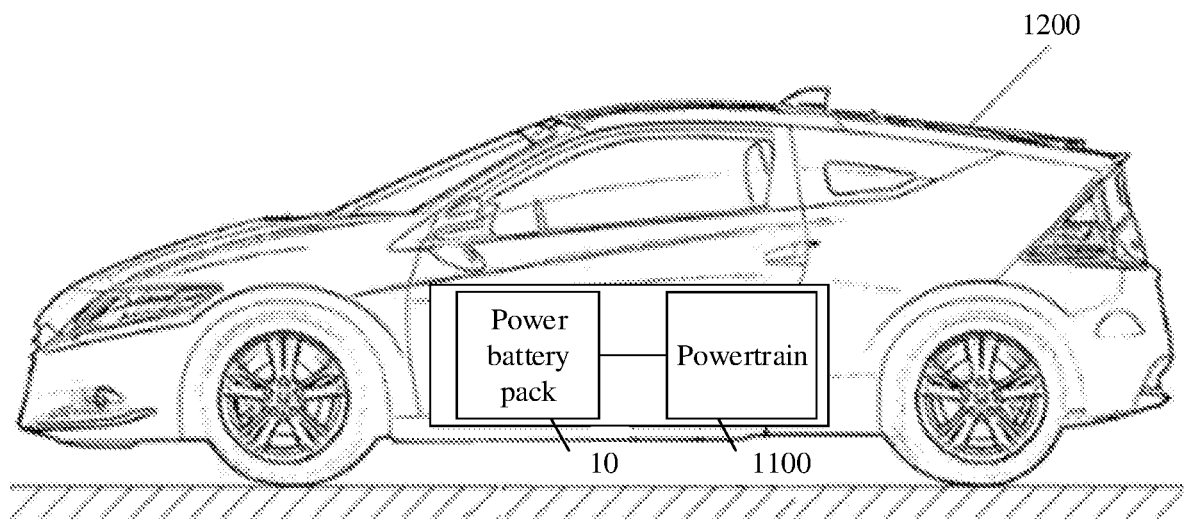
FIG. 12 is a schematic diagram of an electric vehicle according to an embodiment.

FIG. 12 is a schematic diagram of an electric vehicle according to an embodiment.

An electric vehicle 1200 shown in the figure includes a powertrain 1100 and a power battery pack 10.

The powertrain 1100 includes an electric drive system and an electric excitation synchronous motor.

For description of the electric drive system, refer to the related descriptions in the foregoing embodiments, and details are not described again in this embodiment.

An output end of the power battery pack 10 is connected to an input end of the electric drive system, and the power battery pack 10 is configured to provide a direct current for the powertrain 1100.

According to the electric vehicle provided in this embodiment, heating power of windings of three phases is adjusted by adjusting three-phase currents output by an inverter circuit, heating power of an excitation winding is adjusted by adjusting an excitation current output by a direct current-direct current conversion circuit, and the power battery pack is heated by using heat generated by the three-phase windings and the excitation winding and heat generated by a power switching component in the electric drive system without adding an additional heating apparatus. This reduces costs of the electric vehicle. Heating power consumption can further be adjusted by adjusting values of the three-phase currents and the excitation current, to make full use of a heating capability of the electric excitation synchronous motor. Therefore, heating efficiency of the power battery pack is further improved.

It should be understood that "at least one (item)" means one or more and "a plurality of" means two or more. A term "and/or" is used to describe an association relationship between associated objects and indicates that three relationships may exist. For example, "A and/or B" may indicate the following three cases: only A exists, only B exists, and both A and B exist, where A and B may be singular or plural. A character "/" may indicate an "or" relationship between associated objects. "At least one of the following items (pieces)" or a similar expression thereof refers to any combination of these items, including any combination of singular items (pieces) or plural items (pieces). For example, at least one item (piece) of a, b, or c may indicate a, b, c, a and b, a and c, b and c, or a, b, and c, where a, b, and c may be singular or plural.

The foregoing embodiments are merely intended to describe the embodiments but are not intended as limiting. Although described in detail with reference to the foregoing embodiments, a person of ordinary skills in the art should understand that the foregoing embodiments may still be modified or some features thereof may be equivalently replaced. These modifications or replacements do not depart from the spirit and scope of the solutions of the embodiments.

What is claimed is:

1. An electric drive system, wherein an input end of the electric drive system is configured to connect to a power battery pack, an output end of the electric drive system is configured to connect to an electric excitation synchronous motor, and the electric drive system comprises:
    an inverter circuit, wherein an input end of the inverter circuit is configured to connect to the input end of the electric drive system, and an output end of the inverter circuit is configured to connect to three-phase motor windings of the electric excitation synchronous motor;
    a direct current-direct current conversion circuit, wherein an input end of the direct current-direct current conversion circuit is configured to connect to the input end of the electric drive system, and an output end of the direct current-direct current conversion circuit is configured to connect to an excitation winding of the electric excitation synchronous motor; and
    a controller configured to control the inverter circuit and the direct current-direct current conversion circuit, so that a temperature of the power battery pack is greater than or equal to a first temperature threshold;
    the inverter circuit is configured to:
    convert a direct current into three-phase currents and provide the three-phase currents for the three-phase motor windings; and
    the direct current-direct current conversion circuit is configured to:
    perform direct current conversion on the direct current and provide the direct current for the excitation winding.

2. The electric drive system according to claim 1, wherein when determining that the temperature of the power battery pack is lower than the first temperature threshold, the controller controls the direct current-direct current conversion circuit to output an excitation current to the excitation winding and controls the inverter circuit to stop working.

3. The electric drive system according to claim 2, wherein the controller is further configured to determine the excitation current based on the temperature of the power battery pack, and a value of the excitation current is negatively correlated with the temperature of the power battery pack.

4. The electric drive system according to claim 2, wherein the controller is further configured to determine the excitation current according to a heating instruction, and the heating instruction indicates a value of the excitation current.

5. The electric drive system according to claim 2, wherein when determining that the rotor temperature of the electric excitation synchronous motor is greater than the second temperature threshold, the controller is further configured to control the direct current-direct current conversion circuit to reduce the excitation current.

6. The electric drive system according to claim 1, wherein when determining that the temperature of the power battery pack is lower than the first temperature threshold, the controller is further configured to:
    control the inverter circuit to output the three-phase currents to the three-phase motor windings, so that a d-axis current of the electric excitation synchronous motor is a first preset d-axis current, and a q-axis current is zero, and
    control the direct current-direct current conversion circuit to stop working.

7. The electric drive system according to claim 6, wherein the controller is further configured to determine the first preset d-axis current based on the temperature of the power battery pack, and a value of the first preset d-axis current is negatively correlated with the temperature of the power battery pack.

8. The electric drive system according to claim 6, wherein the controller is further configured to determine the first preset d-axis current according to a heating instruction, and the first preset d-axis current indicates a value of the excitation current.

9. The electric drive system according to claim 6, wherein the controller is further configured to:
    determine an amplitude value and a phase of an input current of an each-phase motor winding based on the first preset d-axis current;

determine an amplitude value and a phase of an input voltage of the each-phase motor winding based on the amplitude value and the phase of the input current of the each-phase motor winding and an impedance of the each-phase motor winding;

determine a duty cycle of a control signal of the inverter circuit based on the amplitude value of the input voltage; and determine a sending time of the control signal of the inverter circuit based on the phase of the input voltage.

10. The electric drive system according to claim 6, wherein when determining that the stator temperature of the electric excitation synchronous motor is greater than the third temperature threshold, the controller is further configured to:

control the inverter circuit to maintain the q-axis current at zero, and reduce the first preset d-axis current.

11. The electric drive system according to claim 1, wherein when determining that the temperature of the power battery pack is lower than the first temperature threshold, the controller is further configured to:

control the direct current-direct current conversion circuit to output an excitation current to the excitation winding, and control the inverter circuit to output the three-phase currents to the three-phase motor windings, so that a d-axis current of the electric excitation synchronous motor is a first preset d-axis current, and a q-axis current is zero.

12. The electric drive system according to claim 1, wherein when determining that an electric vehicle is in motion and the temperature of the power battery pack is lower than the first temperature threshold, the controller is further configured to:

control the direct current-direct current conversion circuit to increase an excitation current output to the excitation winding, control the inverter circuit to increase the three-phase currents output to the three-phase motor windings, and enable an output torque of the electric excitation synchronous motor to be a currently required torque.

13. The electric drive system according to claim 12, wherein the controller is further configured to:

determine an amplitude value and a phase of an input current of an each-phase motor winding based on the currently required torque;

determine an amplitude value and a phase of an input voltage of the each-phase motor winding based on the amplitude value and the phase of the input current of the each-phase motor winding and an impedance of the each-phase motor winding;

determine a duty cycle of a control signal of the inverter circuit based on the amplitude value of the input voltage; and determine a sending time of the control signal of the inverter circuit based on the phase of the input voltage.

14. The electric drive system according to claim 12, wherein when determining that the rotor temperature of the electric excitation synchronous motor is greater than the second temperature threshold, the controller is further configured to:

control the direct current-direct current conversion circuit to reduce the excitation current, and control the inverter circuit to increase the three-phase currents.

15. The electric drive system according to claim 12, wherein when determining that the stator temperature of the electric excitation synchronous motor is greater than the third temperature threshold, the controller is further configured to:

control the inverter circuit to reduce the three-phase currents, and control the direct current-direct current conversion circuit to increase the excitation current.

16. A method for heating a power battery pack, applied to an electric drive system, wherein an output end of the electric drive system is configured to connect to an electric excitation synchronous motor, and the method for heating the power battery pack comprises:

controlling an inverter circuit of the electric drive system; and controlling a direct current-direct current conversion circuit of the electric drive system, so that a temperature of the power battery pack is greater than or equal to a first temperature threshold, wherein the inverter circuit is configured to:

convert a direct current into three-phase currents; and provide the three-phase currents for three-phase motor windings of the electric excitation synchronous motor; and the direct current-direct current conversion circuit is configured to:

perform direct current conversion on the direct current; and provide the direct current for an excitation winding of the electric excitation synchronous motor.

17. The method according to claim 16, wherein controlling the inverter circuit of the electric drive system, and controlling the direct current-direct current conversion circuit of the electric drive system further comprise:

when it is determined that the temperature of the power battery pack is lower than the first temperature threshold, controlling the direct current-direct current conversion circuit to output an excitation current to the excitation winding; and controlling the inverter circuit to stop working.

18. The method according to claim 17, further comprising:

determining the excitation current based on the temperature of the power battery pack, and a value of the excitation current is negatively correlated with the temperature of the power battery pack.

19. The method according to claim 16, wherein controlling the inverter circuit of the electric drive system, and controlling the direct current-direct current conversion circuit of the electric drive system further comprise:

when it is determined that the temperature of the power battery pack is lower than the first temperature threshold, controlling the inverter circuit to output the three-phase currents to the three-phase motor windings, so that a d-axis current of the electric excitation synchronous motor is a first preset d-axis current, and a q-axis current is zero; and controlling the direct current-direct current conversion circuit to stop working.

20. The method according to claim 16, wherein controlling the inverter circuit of the electric drive system, and controlling the direct current-direct current conversion circuit of the electric drive system further comprise:

when it is determined that the temperature of the power battery pack is lower than the first temperature threshold, controlling the direct current-direct current conversion circuit to output an excitation current to the excitation winding; and controlling the inverter circuit to output the three-phase currents to the three-phase motor windings, so that a d-axis current of the electric excitation synchronous motor is a first preset d-axis current, and a q-axis current is zero.

* * * * *